Oct. 22, 1968    R. H. WEICHSEL    3,407,013

BEARING SYSTEMS

Filed Feb. 15, 1967

INVENTOR
RICHARD H. WEICHSEL
BY John Mahoney
ATTORNEY

United States Patent Office 3,407,013
Patented Oct. 22, 1968

3,407,013
BEARING SYSTEMS
Richard H. Weichsel, Hudson, Ohio, assignor to The Apex Bearing Company, a corporation of Ohio
Filed Feb. 15, 1967, Ser. No. 616,405
7 Claims. (Cl. 308—122)

ABSTRACT OF THE DISCLOSURE

An outer housing having peripheral end flanges, a straight groove and cylindrical or helically-shaped segmental grooves arranged within the peripheral flanges and intercepted by the straight groove. A porous sleeve is tightly engaged by the peripheral flanges of the housing to provide a composite structure. The sleeve surrounds a shaft with sufficiently close tolerance to form an air film therebetween but at a sufficient distance to permit the composite housing and sleeve to be moved in a linear direction relative to the shaft when the shaft is supported at its opposite ends or to permit the shaft to be moved in a linear direction within the bearing when the composite housing and sleeve are supported on a stationary base plate. The sleeve is composed of spherically-shaped copper particles encapsulated with sintered tin in the form of venturi-shaped pores for restricting the passage of air through the sleeve when air is passed through a socket into the straight groove and from thence through the cylindrical or helically-shaped segmental grooves, and the porous plate which air then expands and forms a thin uniform film inside of the sleeve. The linear thickness of the sleeve is sufficient to support the static or at rest load at the working surface and the width of the grooves and lands are substantially the same as the linear thickness of the sleeve and the depth of the grooves is approximately one-half of the linear thickness of the sleeve.

---

The present invention relates to bearing systems and more particularly to gas bearings, such as air, engine exhaust gases or the like, interposed between a porous sleeve and a shaft which shaft may have linear motion relative to the bearing or in which the bearing may have linear motion relative to the shaft.

To prevent vibration in a compressed gas bearing, there must be a limited amount of gas in combination with the lubricating gas film. In other words, there must be a restriction between the lubricating gas film and a compressed gas source to isolate the air supply from the film to a sufficient extent to dampen vibrations. The restriction, however, must not be sufficient to prevent the flow of the gas to the film to provide pressure upon the film.

To provide gas bearing systems, it has heretofore been proposed to utilize a bearing having multiple holes leading to the gas film. In such bearings, the restriction varies with the thickness of the film and it is difficult to obtain a substantially uniform load supporting film. It has also been proposed to use mechanically-formed porous type bearings through which a gas may be passed to provide a gas film. In bearings of the mechanically-formed porous type, gas restriction occurs ahead of the port of entry of the gas to the film. Restriction therefore does not vary with the thickness of the film as in the case of the multiple hole type bearing and consequently the bearing can be more easily loaded than with multiple hole feed bearings. In porous type bearings as previously provided, however, considerable turbulence occurs and it is difficult to provide a substantially uniform gas bearing for a linearly movable member.

In accordance with the present invention, an improved gas bearing is provided in which a thin substantially uniform, nonturbulent gas film may be provided between a bearing and a linearly movable member, such as a shaft, or in which a similar gas film may be provided between a bearing which is movable linearly in either direction upon a stationary member, such as a shaft.

My invention will be better understood by reference to the accompanying drawings in which.

Figure 1:
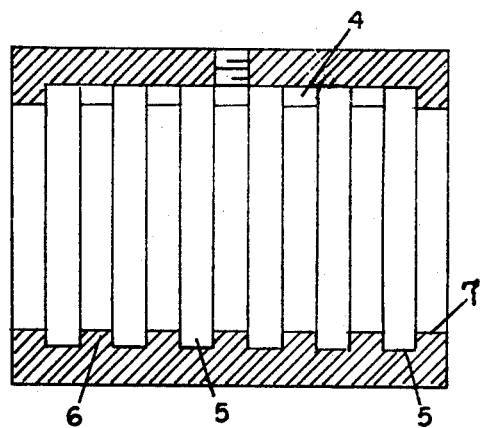
FIG. 1 is a central cross sectional view of the outer housing of a bearing.
Figure 2:
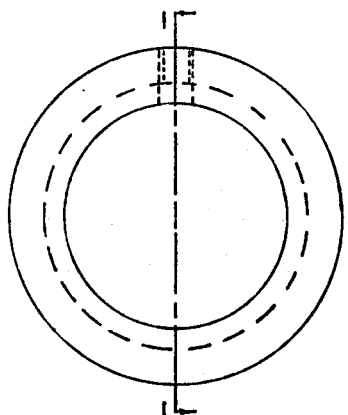
FIG. 2 is an end view of the outer housing.
Figure 3:
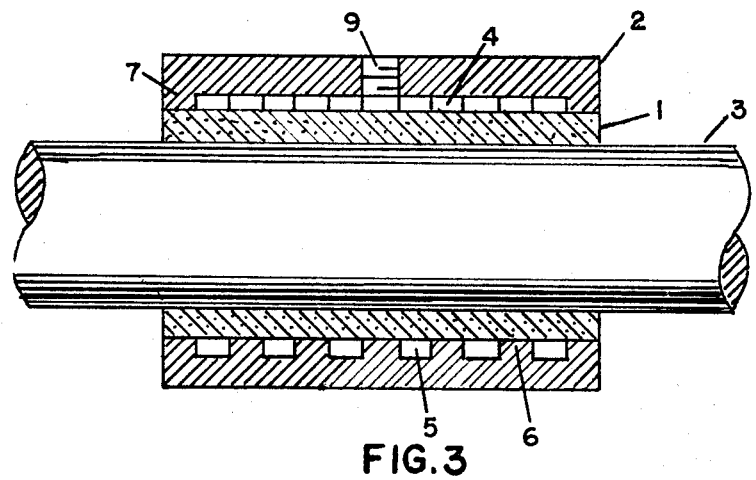
FIG. 3 is a cross sectional view of the bearing showing it applied to a shaft which is shown in elevation.

As shown in the drawing, a stationary bearing is provided including an outer housing and a porous sleeve within which sleeve a shaft may be moved linearly in either direction or the opposite ends of the shaft may be supported in any desirable manner in which case the bearing may be moved linearly in either direction upon the shaft. During movement of the shaft within the bearing, the bearing may of course be supported in any desirable manner. For instance, it may be provided with supporting saddles at opposite ends which may be welded or otherwise secured thereto, each of which has an outwardly extending flange which may be secured to a base plate by suitable means, such as bolts as disclosed more particularly in my copending application Ser. No. 623,490 filed on even date herewith.

As illustrated in the drawings, the bearing of the present invention consists of an inner porous sleeve 1 and an outer metallic housing 2 which may be formed of aluminum, steel, or bronze. The sleeve may be formed of any suitable porous material affording sufficient feed therethrough to provide and sustain a substantially uniform gas film between the sleeve and a linearly movable member, such as a shaft 3. It is preferably composed of a commercially available material, such as "Oilite" which consists of a body composed of small copper spheres of approximately 100 mesh and of substantially uniform size which is interspersed with sintered tin particles of approximately 200 mesh. In preparing the sleeve, the copper and tin particles which are substantially spherical in shape and of the size specified are first pressed into a unitary structure and sufficient heat is then applied to sinter the tin. A temperature of approximately 1535° Fahrenheit may be used. The temperature, however, should not be sufficient to liquefy the copper. The copper therefore retains its spherical shape and is encapsulated by the sintered tin to provide myriads of venturi-shaped pores through which the gas passing through the sleeve meets its maximum restriction which is evidenced by a substantial pressure drop. After the gas passes outwardly through the venturi-shaped pores in the sleeve, it expands to form a thin, nonturbulent film which lies in close proximity to the inside diameter of the sleeve.

In sleeve 1, the small copper spheres preferably constitute the major proportion of the sleeve and while I do not desire to be limited to any particular proportions, the copper spheres may be present in an amount ranging from approximately 60% to 90% and the tin in proportions ranging from approximately 10% to 40%. For example, a sleeve may be composed of approximately 90% copper spheres and 10% of sintered tin.

In preparing the composite bearing, a sleeve which is formed of the gas permeable material may be selected which has the proper inside diameter to receive the shaft 3 with a comparatively close tolerance, such as approximately .001 of an inch and the outer housing may be formed of a metal that may be machined, such as steel, aluminum, or bronze. The outer housing is then provided with a substantially straight groove 4 to which is connected substantially circular grooves 5 separated by lands 6 as shown in FIG. 1, or if desired, a helical groove may be formed in the housing which is interrupted at intervals by the straight groove 4. The groove or grooves are then deburred.

The outside diameter of the sleeve and the inside diameter of the housing should be substantially equal although each may vary from approximately minus .00025 on the outer inside diameter to plus .00025 on the inner outside diameter from its nominal diameter. In such case, the sleeve may be cooled to a temperature of approximately 0° Fahrenheit and the housing may be heated to a temperature of approximately 250° Fahrenheit. The outer housing which has peripheral flanges or lands 7 at its opposite ends is then slipped over the porous sleeve and the assembly is allowed to cool to room temperature. The composite bearing may then be mounted upon a mandrel and the outer housing turned to provide the desired outside diameter and concentricity.

To properly supply the porous metal sleeve with a sufficient amount of gas, the construction should be of a nature to allow the pressure to be uniform at the working surface. To obtain this uniform head, the normal linear wall thickness of the sleeve should be in keeping with that which is required to support the static or at rest load at the working surface. Having thus established the lateral wall thickness of the sleeve, this linear measurement should constitute the width of both the channels or grooves and the ribs or lands 6. In such case the depth of the grooves 5 is one-half of the width of the grooves. With such an arrangement, a gas, such as air, flowing from a conduit means to a tapped opening 9 into groove 4 is first restricted by the venturi-shaped pores in the sleeve and then expands to form a thin, nonturbulent uniform film between the sleeve and the shaft 3.

What I claim is:

1. The combination of a bearing and a shaft, said bearing including an inner sleeve having a myriad of pores therein which are restrictive to the flow of a gas which sleeve surrounds said shaft and is in sufficient close tolerance therewith to provide a space for a thin film of gas between said shaft and said sleeve, said bearing also including an outer metallic housing having a peripheral flange at its opposite end portions which engage said sleeve, said housing being also provided with a substantially straight groove and a plurality of substantially annular grooves which are intercepted by the straight groove, lands on the housing for separating said grooves from each other, and means whereby a gas may be passed into the substantially straight groove in the outer housing from whence it flows through the annular grooves into contact with and through the porous sleeve in which its flow is restricted to a sufficient extent that the gas upon passing through the porous sleeve forms a thin annular gas bearing in proximity to its inside diameter.

2. The combination as defined in claim 1 in which the shaft is movable linearly relative to the bearing.

3. The combination as defined in claim 1 in which the bearing is movable linearly relative to said shaft.

4. The combination as defined in claim 1 in which a helical groove surrounds the inner porous bearing which is separated by lands on the outer housing and which is intercepted at points throughout its length by the straight groove.

5. The combination as defined in claim 1 in which the pores in said sleeve are substantially venturi in shape.

6. The combination as defined in claim 5 in which the width of the grooves and the width of the lands between the grooves are of substantially the same size as the thickness of said sleeve and the depth of the grooves are substantially one-half of the thickness of the sleeve.

7. The combination as defined in claim 1 in which the bearing is stationary and the shaft is movable within the bearing.

References Cited

UNITED STATES PATENTS 2,696,410 12/1954 Topanelian _____ 308—122 X
2,855,249 10/1958 Gerard _____ 308—122

MARTIN P. SCHWADRON, *Primary Examiner.*
CARROLL B. DORITY, *Assistant Examiner.*